March 6, 1928.
J. SCHERNER
1,661,682
WRENCH MECHANISM
Filed March 8, 1922
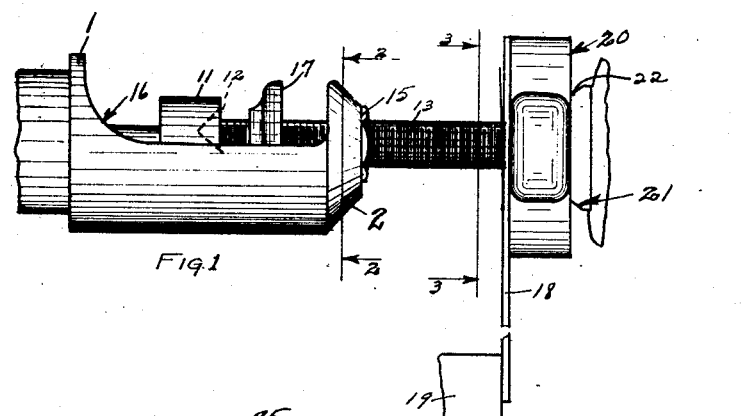
Fig.1
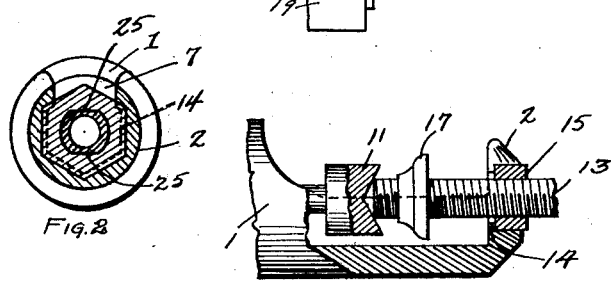
Fig.2
Fig.4.
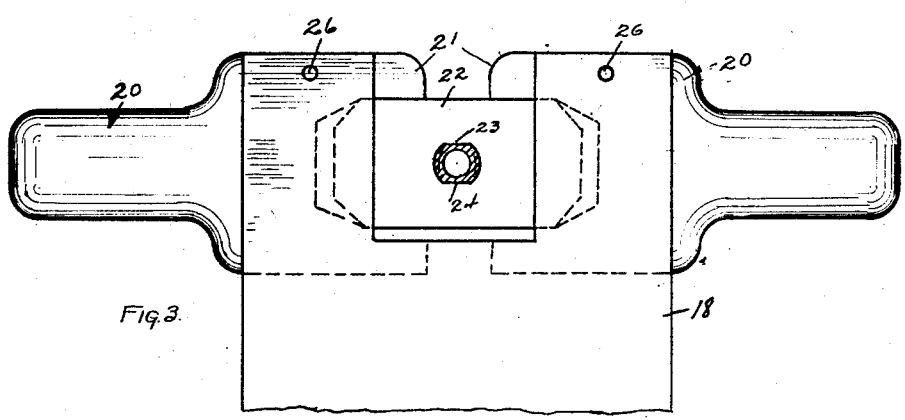
Fig.3.
JOHN SCHERNER
INVENTOR
BY Hadley H Freeman
ATTORNEY Patented Mar. 6, 1928.

1,661,682

UNITED STATES PATENT OFFICE.

JOHN SCHERNER, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

WRENCH MECHANISM.

Application filed March 8, 1922. Serial No. 542,161.

The usual inner tube for a pneumatic casing is apertured to receive a metal valve unit which comprises a base adapted to be forced through the aperture and then engage the inner wall of the tube, a stem rigid with the base and protruding through the aperture, a spreader adapted to encircle the stem and overlie the outer surface of the tube adjacent the aperture, a nut adapted to engage threads on the stem and to be screwed against the spreader to securely clamp the wall of the tube between the spreader and the base, and a second nut also adapted to engage threads on the stem and utilized to secure the stem to the felly. When delivered to the operator who inserts the unit in the tube the spreader and nuts are on the stem but are not tightened into position and the operator first inserts the base into the tube and then tightens the spreader nut. This tightening may be performed by hand but is usually and far more rapidly performed by a machine into which the valve stem is inserted so that the machine engages the nut to rapidly rotate it while the stem is gripped by the operator and thus held stationary. Inasmuch as the felly nut is larger than the spreader nut it is necessary to remove the felly nut before the stem can be inserted in the machine and to thereafter replace it. Inasmuch as considerable torque is applied to the spreader nut by the machine it is quite difficult for the operator to prevent rotation of the stem. My invention comprises modifications and additions to the usual machines to permit tightening of the spreader nut without removal of the felly nut and to automatically hold the stem against rotation. In the drawings accompanying this specification and forming a part thereof I have shown, for purposes of illustration, one form which my invention may assume. In these drawings:

Fig. 1 is a fragmentary side elevation illustrating my invention,

Fig. 2 is a section on the line 2—2 of Figure 1,

Fig. 3 is a section on the line 3—3 of Figure 1, and

Fig. 4 is a side elevation partly in section of the wrench portion of my device.

The machine herein illustrated comprises a rotatable hollow cylindrical wrench element 1 cut away as indicated at 16. The forward end 2 of member 1 is formed with an open seat 14 adapted to receive and hold the spreader nut 15 as clearly shown in Fig. 4. Positioned within the cut away portion of member 1 is a movable shank 11 provided with a recess 12 adapted to loosely receive the valve stem 13. As will be evident from Figs. 1 and 4 when the spreader nut 15 is positioned in seat 14 and the end of the stem is engaged in recess 12, the felly nut 17 lies in the cavity of the member 1 out of contact with any part of the device and is therefore unaffected by rotation of the wrench mechanism.

The machine herein illustrated comprises also a flexible upright 18 suitably supported by a base 19, carrying at its upper side a block 20 supporting a pair of jaws 21 recessed to non-rotatably receive the spreader 22 which is held against rotation on the stem 13 by the engagement of the flat faces 23 of the spreader aperture 24 with the flat sides 25 of the stem 13. The block 20 and jaws 21 are free to flex forward as the stem advances upon rotation of the spreader nut 15 so that the jaws 21 at all times act through the spreader 22 to prevent rotation of the stem 13. If desired, the jaws 21 may be pivoted to the block 20 as at 26 to enable them to be swung in to more securely grip the spreader 22.

The operation may be summarized as follows: The spreader 22 of the valve is gripped between jaws 21, the stem 13 swung downwardly and forwardly to position spreader nut 15 in seat 14 and engage the end of the stem in recess 12, with the felly nut 17 between part 2 and shank 11. The wrench mechanism 1 with its associated parts is then rotated, and as the stem 13 is held against rotation (the spreader 22 being held by jaws 21) the stem advances into the rotating nut 15, support 18 flexing to permit this advance.

I claim:—

1. In a machine for rotating a nut on a valve stem provided with a spreader and carrying a second nut, means for receiving said stem, means to hold said spreader against rotation, means for rotating one of said nuts, said last means being formed with a cut-away portion to leave the other nut free.

2. In a machine for rotating a nut on a valve stem carrying a spreader, means to hold said spreader against rotation, means for rotating said nut, said holding means being yieldable to permit longitudinal movement of the stem and spreader.

3. A device as in claim 2, wherein the rotating means for said nut is cut away to permit the presence of a second nut on said stem during rotation of said rotating means.

4. In a machine for rotating a nut on a valve stem carrying a spreader, means to hold the spreader against rotation and a rotatable member adapted to engage the nut and loosely receive the end of the stem, said holding means being yieldable to permit longitudinal movement of the stem and spreader as the stem advances into the nut upon rotation of the latter.

5. In a machine for rotating a nut on a valve stem carrying a spreader, means to hold the spreader against rotation, and a rotatable shank provided with a recess adapted to loosely receive the end of the valve stem, and an open-sided nut engaging member adapted to receive a nut positioned on the stem, said holding means being yieldable to permit longitudinal movement of the stem and spreader as the stem advances into the nut upon rotation of nut-engaging member.

In testimony whereof I have signed my name to the above specification.

JOHN SCHERNER.